US012570133B2

(12) United States Patent
Sao et al.

(10) Patent No.: US 12,570,133 B2
(45) Date of Patent: Mar. 10, 2026

(54) BATTERY PACK

(71) Applicant: HONDA MOTOR CO., LTD., Tokyo (JP)

(72) Inventors: Shutaro Sao, Saitama (JP); Ken Yasui, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 412 days.

(21) Appl. No.: 18/114,573

(22) Filed: Feb. 27, 2023

(65) Prior Publication Data

US 2023/0286366 A1 Sep. 14, 2023

(30) Foreign Application Priority Data

Mar. 9, 2022 (JP) .................................. 2022-036506

(51) Int. Cl.
B60K 1/04 (2019.01)

(52) U.S. Cl.
CPC ........ B60K 1/04 (2013.01); B60K 2001/0438 (2013.01)

(58) Field of Classification Search
CPC .......................... B60K 1/04; B60K 2001/0438
See application file for complete search history.

(56) References Cited

U.S. PATENT DOCUMENTS

| | | | | |
|---|---|---|---|---|
| 8,657,350 B2 * | 2/2014 | Cabo | .......................... | B60R 19/00 |
| | | | | 180/69.1 |
| 8,776,920 B2 * | 7/2014 | Suzuki | ................. | B60K 15/063 |
| | | | | 180/311 |

| | | | | |
|---|---|---|---|---|
| 8,776,925 B2 * | 7/2014 | Bender | .................... | B60L 50/64 |
| | | | | 180/69.1 |
| 8,863,878 B2 * | 10/2014 | Shirooka | .................. | B60K 1/04 |
| | | | | 180/68.5 |
| 9,242,540 B2 * | 1/2016 | Shirooka | .................. | B60K 1/04 |
| 10,829,157 B2 * | 11/2020 | Kato | ......................... | B60G 3/18 |
| 11,639,092 B1 * | 5/2023 | Wright | .................... | B60L 15/20 |
| | | | | 180/65.8 |
| 11,745,574 B2 * | 9/2023 | Marginet | ........... | B62D 25/2018 |
| | | | | 180/68.5 |
| 2009/0236162 A1 | 9/2009 | Takasaki et al. | | |
| 2013/0153318 A1 | 6/2013 | Shirooka et al. | | |
| 2019/0276081 A1 | 9/2019 | Otoguro et al. | | |

(Continued)

FOREIGN PATENT DOCUMENTS

| | | |
|---|---|---|
| CN | 110239328 A | 9/2019 |
| CN | 210733809 U | 6/2020 |
| CN | 112606908 A | 4/2021 |

(Continued)

OTHER PUBLICATIONS

Feb. 6, 2024, Translation of Japanese Office Action issued for related JP Application No. 2022-036506.

(Continued)

*Primary Examiner* — Katy M Ebner
(74) *Attorney, Agent, or Firm* — Paratus Law Group, PLLC

(57) ABSTRACT

A battery pack which is disposed under a floor of a vehicle includes a plurality of battery cells, and a battery case which accommodates the plurality of battery cells, in which the battery case includes a fixing portion to which a portion of a suspension of the vehicle is fixed.

5 Claims, 5 Drawing Sheets

(56)                    References Cited

U.S. PATENT DOCUMENTS

| | | | |
|---|---|---|---|
| 2020/0283067 A1* | 9/2020 | Reineke ................. | B62D 25/20 |
| 2021/0101464 A1 | 4/2021 | Matsushima et al. | |

FOREIGN PATENT DOCUMENTS

| | | | |
|---|---|---|---|
| JP | H09-286216 A | 11/1997 | |
| JP | H09-286255 A | 11/1997 | |
| JP | 2008-302813 A | 12/2008 | |
| JP | 2009-087645 A | 4/2009 | |
| JP | 2011-218910 A | 11/2011 | |
| JP | 2012-056336 A | 3/2012 | |
| JP | 2012-096789 A | 5/2012 | |
| JP | 2017-185948 A | 10/2017 | |
| JP | 2020004568 A | * | 1/2020 |

OTHER PUBLICATIONS

Apr. 3, 2025, Translation of Chinese Office Action issued for related
CN Application No. 202310189104.0.

* cited by examiner

BATTERY PACK

CROSS-REFERENCE TO RELATED APPLICATIONS

This application is based on and claims priority under 35 USC 119 from Japanese Patent Application No. 2022-036506 filed on Mar. 9, 2022.

TECHNICAL FIELD

The present disclosure relates to a battery pack mounted on a vehicle.

BACKGROUND ART

In recent years, research and development on secondary batteries which contribute to improvement in energy efficiency have been carried out to secure access to affordable, reliable, sustainable, and modern energy for more people.

A secondary battery is accommodated in a case and mounted on a vehicle as a battery pack. In the related art, when mounting a battery pack on a vehicle, a work of attaching a rear suspension to a vehicle body and then attaching the battery pack to the vehicle body is necessary. JP-A-2017-185948 discloses attachment of a battery pack to a vehicle body, and JP-A-2008-302813 discloses attachment of a compliance bushing to a vehicle body.

However, in the related-art work process, the work of attaching the rear suspension to the vehicle body and the work of attaching the battery pack to the vehicle body are necessary, and there is a problem that assembly takes time.

SUMMARY

An object of the present disclosure is to facilitate assembly of a suspension and a battery pack to a vehicle body. The present disclosure contributes to improvement in energy efficiency.

According to an aspect of the present disclosure, there is provided a battery pack disposed under a floor of a vehicle, the battery pack including: a plurality of battery cells; and a battery case which accommodates the plurality of battery cells, in which the battery case includes a fixing portion to which a portion of a suspension of the vehicle is fixed.

According to the present disclosure, since a battery pack and a suspension can be integrally mounted on a vehicle, the number of assembly steps and assembly time can be reduced.

DESCRIPTION OF EMBODIMENTS

Figure 1:
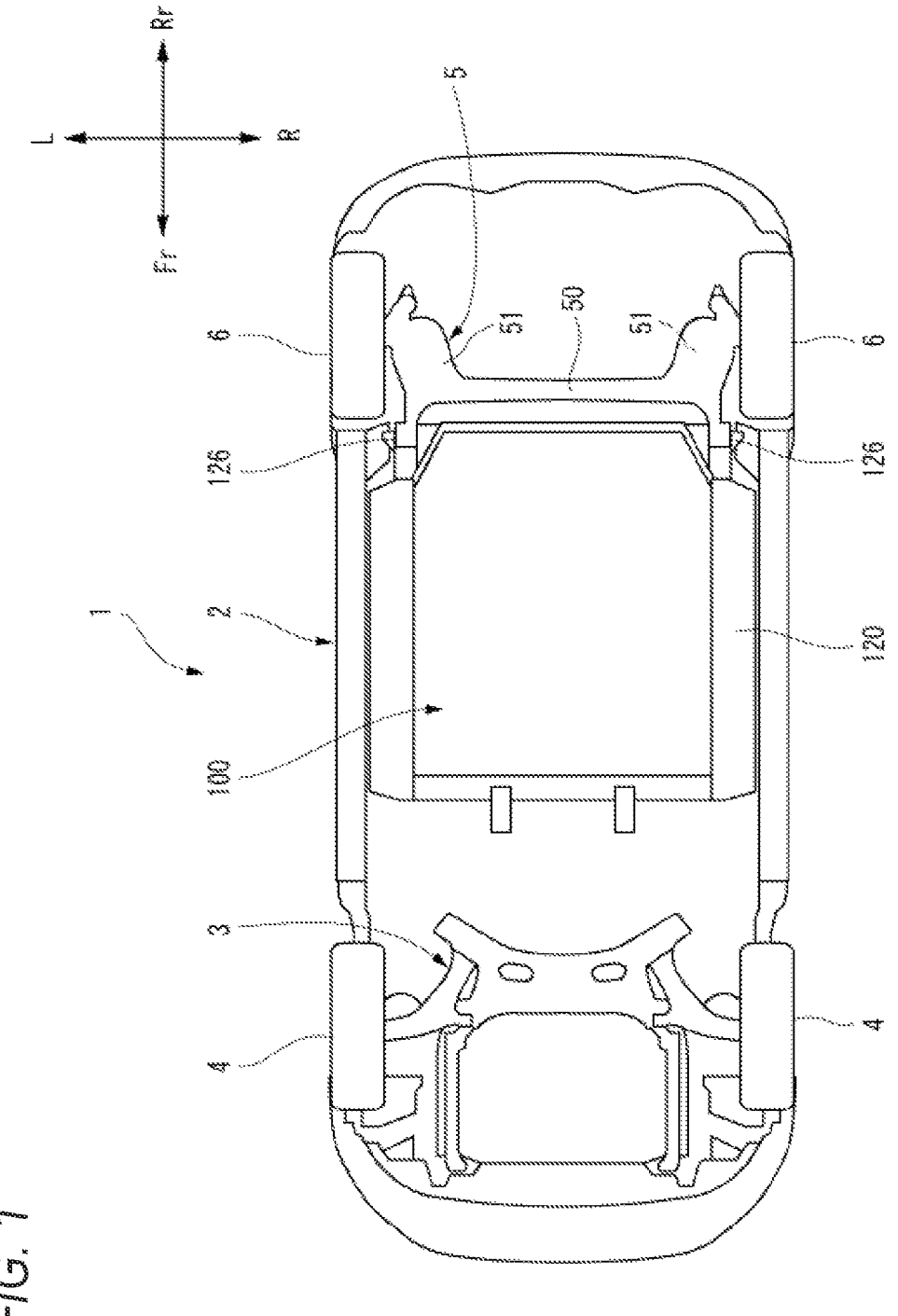
FIG. 1 is a schematic bottom view illustrating a vehicle body lower structure of a vehicle 1 on which a battery pack 100 is mounted.

Hereinafter, an embodiment of the present disclosure will be described with reference to FIGS. 1 to 5. The drawings are viewed from directions of reference signs. In the following description, a front-rear direction, a left-right direction, and an upper-lower direction are based on directions viewed from a driver. In the drawings, a front side of the vehicle is denoted by Fr, a rear side thereof is denoted by Rr, a left side thereof is denoted by L, a right side thereof is denoted by R, an upper side thereof is denoted by U, and a lower side thereof is denoted by D.

A battery pack 100 according to an embodiment of the present disclosure is mounted, for example, under a floor of a vehicle 1 having a vehicle body lower structure as illustrated in FIG. 1. The vehicle 1 illustrated in FIG. 1 is an electric vehicle which travels by motor power (or motor power and engine power), and includes a vehicle body 2, left and right front wheels 4 rotatably provided via a front suspension 3 at a front portion of the vehicle body 2, left and right rear wheels 6 rotatably provided via a rear suspension 5 at a rear portion of the vehicle body 2, and the battery pack 100 mounted on a bottom of the vehicle body 2.

Figure 4:
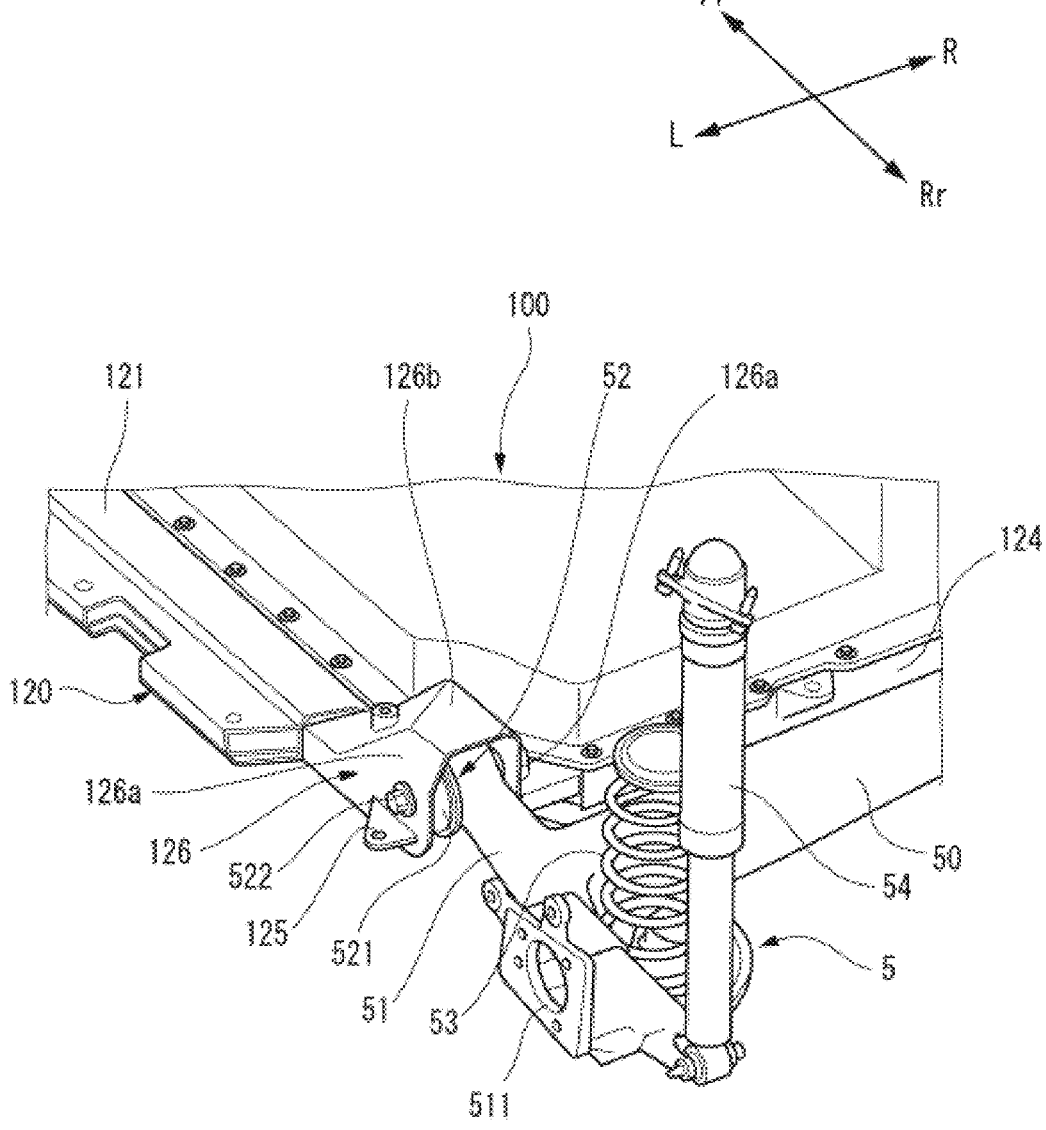
FIG. 4 is a major-part perspective view illustrating a rear suspension 5 fixed to the battery pack 100.
Figure 5:
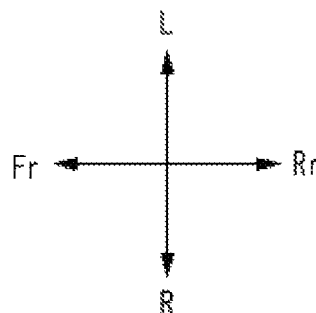
FIG. 5 is a major-part bottom view illustrating the rear suspension 5 fixed to the battery pack 100.
Figure 5:
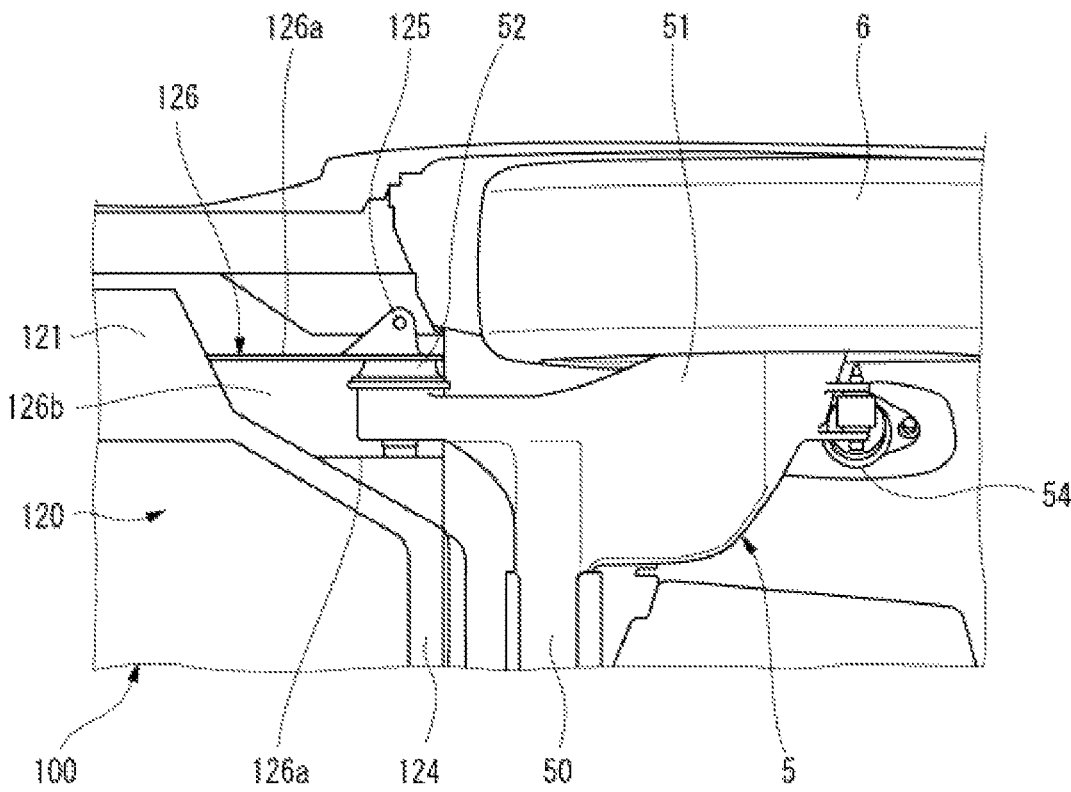

As illustrated in FIGS. 4 and 5, the rear suspension 5 includes, for example, a suspension member 50 which extends in the left-right direction, a pair of left and right suspension arms 51 which are provided at both left and right ends of the suspension member 50 and which include attachment portions 511 of the rear wheels 6, a pair of left and right compliance bushings 52 which are interposed between the vehicle body 2 and the suspension arms 51 and which couple the suspension arms 51 to the vehicle body 2 in a manner of being rotatable in the upper-lower direction, a pair of left and right coil springs 53 which are interposed between the vehicle body 2 and the suspension arms 51 and which elastically support the vehicle body 2, and a pair of left and right shock absorbers 54 which are interposed between the vehicle body 2 and the suspension arms 51 and which attenuate movement of the coil springs 53.

As illustrated in FIG. 4, the compliance bushing 52 includes a bushing 521 fitted to an inner peripheral side of a tubular portion (not illustrated) of the suspension arm 51, and a shaft 522 which penetrates the bushing 521. The bushing 521 includes an elastically deformable buffer member. Both ends of the shaft 522 are fixedly supported on a vehicle body 2 side in a double-supported manner. Accordingly, the compliance bushing 52 prevents transmission of vibration from a suspension arm 51 side to the vehicle body 2 side while coupling the suspension arm 51 to the vehicle body 2 in a manner of being rotatable in the upper-lower direction.

Figure 2:
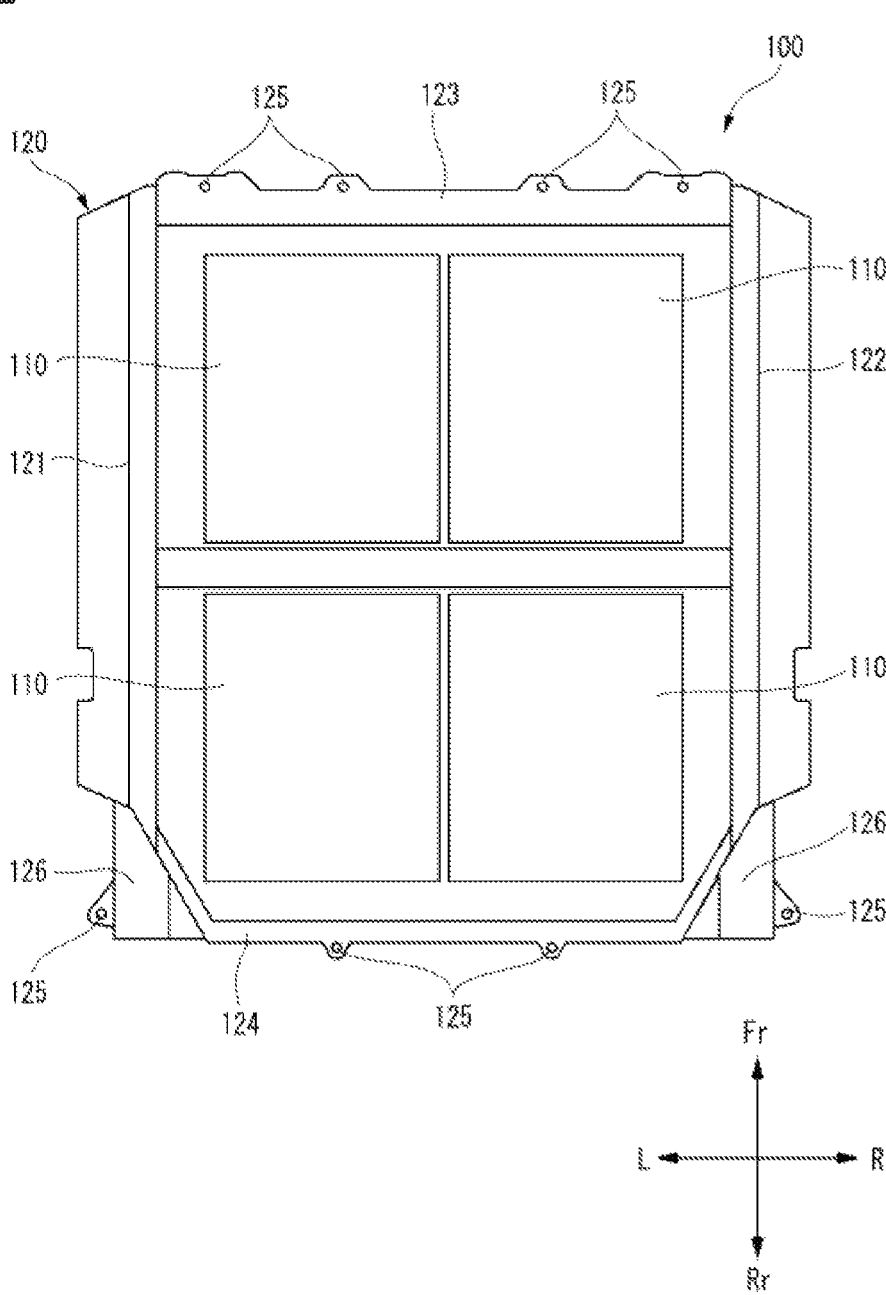
FIG. 2 is a schematic plan view illustrating an inside of the battery pack 100.
Figure 3:
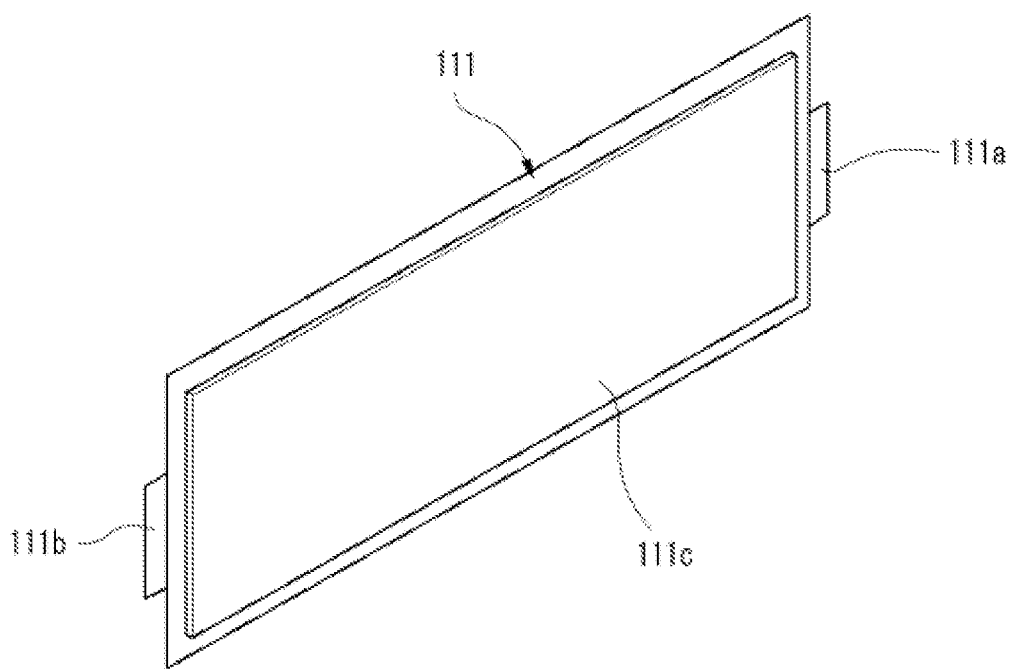
FIG. 3 is a perspective view of a battery cell 111.

As illustrated in FIGS. 1 to 3, the battery pack 100 includes a plurality of (four in the present embodiment) divided cell groups 110, and a battery case 120 which accommodates the plurality of cell groups 110. The cell group 110 is configured by laminating a plurality of battery cells 111 in the left-right direction, but the number of battery cells 111, a lamination direction, the number of cell groups 110, and the like can be appropriately changed.

The battery cell 111 is, for example, a solid-state battery. As illustrated in FIG. 3, the battery cell 111 formed of the solid-state battery includes a positive electrode to which a positive electrode tab 111a is coupled, a negative electrode to which a negative electrode tab 111b is coupled, a solid electrolyte disposed between the positive electrode and the negative electrode, and a laminate film 111c which accommodates the positive electrode, the negative electrode, and the solid electrolyte, and performs charging and discharging by exchanging lithium ions between the positive electrode and the negative electrode via the solid electrolyte.

The solid electrolyte is not particularly limited as long as the solid electrolyte has lithium ion conductivity and insulation properties. Generally, a material used for an all-solid-state lithium-ion battery may be used. Examples of the solid electrolyte can include a sulfide solid electrolyte material, an oxide solid electrolyte material, an inorganic solid electrolyte such as lithium-containing salt, a polymer-based solid electrolyte such as polyethylene oxide, and a gel-based solid electrolyte containing lithium-containing salt or a lithium-ion conductive ionic liquid. A form of the solid electrolyte material is not particularly limited, and examples thereof can include a particulate form.

As illustrated in FIG. 2 and the like, the battery case 120 has a substantially rectangular frame structure in a plan view. The frame structure includes a pair of side frames 121 and 122 which face each other in the left-right direction such that the cell groups 110 are sandwiched, and a front frame 123 and a rear frame 124 which face each other in the front-rear direction such that the cell groups 110 are sandwiched. Further, the battery case 120 includes a plurality of vehicle body fixing portions 125 at a peripheral edge portion thereof, and these vehicle body fixing portions 125 are fastened to the vehicle body 2, thereby the battery pack 100 being fixed to a bottom of the vehicle body 2.

As illustrated in FIGS. 4 and 5, the battery case 120 includes a pair of left and right suspension fixing portions 126 to which a portion of the rear suspension 5 is fixed. The suspension fixing portion 126 includes a pair of side walls 126a which face each other in the left-right direction and an upper wall 126b which couples upper ends of the pair of side walls 126a to each other, and the shaft 522 of the compliance bushing 52 is fixedly supported by the left and right side walls 126a in a double-supported manner.

According to such a battery case 120, since the battery pack 100 and the rear suspension 5 can be integrally mounted on the vehicle 1, the number of assembly steps and assembly time can be reduced. Further, since a portion of the rear suspension 5 is fixed to the battery case 120, the number of fixing locations of the rear suspension 5 on the vehicle body 2 side can be reduced, and layout property on the vehicle body 2 side can be improved. Further, since the compliance bushing 52 is fixed to the suspension fixing portions 126 of the battery case 120, a load input from the rear suspension 5 can be received by the battery pack 100.

The suspension fixing portions 126 of the battery case 120 are provided in a manner of overlapping with the rear frame 124 of the battery case 120 when viewed from the left-right direction. In this way, the rear frame 124 of the battery case 120 and the rear suspension 5 are integrated with each other, and rigidity in a vehicle width direction is improved, so that steering stability can be improved.

The suspension fixing portions 126 of the battery case 120 are provided in a manner of overlapping with the side frames 121 and 122 when viewed from the front-rear direction. In this way, the side frames 121 and 122 of the battery case 120 and the rear suspension 5 are integrated with each other, and rigidity in the front-rear direction is improved, so that steering stability and riding comfort can be improved. Further, since the load input from the rear suspension 5 is transmitted to the side frames 121 and 122, transmission efficiency of the load is increased. Further, since the side frames 121 and 122 of the battery case 120 can be used as load paths, it is possible to prevent deformation during an impact.

In other words, the suspension fixing portions 126 of the battery case 120 are disposed at corner portions formed by the side frames 121 and 122 and the rear frame 124. In this way, the side frames 121 and 122 and the rear frame 124 of the battery case 120 are integrated with the rear suspension 5, and the rigidity in the vehicle width direction and the front-rear direction is improved, so that the steering stability and the riding comfort can be improved. Further, since the load input from the rear suspension 5 is transmitted to the side frames 121 and 122 and the rear frame 124, the transmission efficiency of the load is increased. Further, since the rear frame 124 and the side frames 121 and 122 of the battery case 120 can be used as the load paths, it is possible to prevent the deformation during the impact.

Although various embodiments have been described above with reference to the drawings, it is needless to say that the present invention is not limited to these examples. It will be apparent to those skilled in the art that various changes and modifications may be conceived within the scope of the claims. It is also understood that the various changes and modifications belong to the technical scope of the present invention. Further, the components in the embodiments described above may be combined freely within a range not departing from the spirit of the invention.

In the present specification, at least the following matters are described. Corresponding components in the above embodiment are shown in parentheses. However, the present invention is not limited thereto.

(1) A battery pack (the battery pack 100) disposed under a floor of a vehicle (the vehicle 1), the battery pack including:

a plurality of battery cells (the battery cells 111); and a battery case (the battery case 120) which accommodates the plurality of battery cells, in which the battery case includes a fixing portion (the suspension fixing portion 126) to which a portion of a suspension (the rear suspension 5) of the vehicle is fixed.

According to (1), since the battery pack and the suspension can be integrally mounted on the vehicle, the number of assembly steps and assembly time can be reduced. Further, since it is not necessary to provide the fixing portion at a framework member of the vehicle by fixing a portion of the suspension to the battery case, layout property is improved.

(2) The battery pack according to (1), in which the portion is a compliance bushing (the compliance bushing 52).

According to (2), a load input from the suspension can be received by the battery pack.

(3) The battery pack according to (1) or (2), in which the suspension is a rear suspension (the rear suspension 5).

According to (3), a load input from the rear suspension can be received by the battery pack.

(4) The battery pack according to (3), in which the battery case includes:

a pair of side frames (the side frames 121 and 122) which face each other such that the plurality of battery cells are sandwiched; and a pair of front frame (the front frame 123) and rear frame (the rear frame 124) which face each other such that the plurality of battery cells are sandwiched, and in which the fixing portion overlaps with the rear frame when viewed from a left-right direction.

According to (4), the rear frame of the battery case and the rear suspension are integrated with each other, so that rigidity in a vehicle width direction is improved, and steering stability is improved.

(5) The battery pack according to (3) or (4), in which the battery case includes:

a pair of side frames (the side frames 121 and 122) which face each other such that the plurality of battery cells are sandwiched; and a pair of front frame (the front frame 123) and rear frame (the rear frame 124) which face each other such that the plurality of battery cells are sandwiched, and in which the fixing portion overlaps with the side frames when viewed from a front-rear direction.

According to (5), the side frames of the battery case and the rear suspension are integrated with each other, so that rigidity in the front-rear direction is improved, and the steering stability and riding comfort are improved. Further, since the load input from the rear suspension is transmitted to the side frames, transmission efficiency of the load is increased. Further, the side frames of the battery case can be used as load paths, so that it is possible to prevent deformation during an impact.

(6) The battery pack according to any one of (3) to (5), in which the battery case includes:

a pair of side frames (the side frames 121 and 122) which face each other such that the plurality of battery cells are sandwiched; and a pair of front frame (the front frame 123) and rear frame (the rear frame 124) which face each other such that the plurality of battery cells are sandwiched, and in which the fixing portion is disposed at a corner portion formed by the side frame and the rear frame.

According to (6), the side frames and the rear frame of the battery case are integrated with the rear suspension, so that rigidity in a vehicle width direction and a front-rear direction is improved, and the steering stability and the riding comfort are improved. Further, since the load input from the rear suspension is transmitted to the side frames and the rear frame, the transmission efficiency of the load is increased. Further, the rear frame and the side frames of the battery case can be used as the load paths, so that it is possible to prevent the deformation during the impact.

(7) The battery pack according to any one of (1) to (6), in which the battery cell is a solid-state battery.

According to (7), by using a solid-state battery resistant to the impact, it is possible to prevent an influence of the impact on the battery cell.

What is claimed is:

1. A battery pack disposed under a floor of a vehicle, the battery pack comprising:

a plurality of battery cells; and a battery case which accommodates the plurality of battery cells, wherein the battery case includes a fixing portion to which a portion of a suspension of the vehicle is fixed, wherein the battery case includes:

a pair of side frames which face each other such that the plurality of battery cells are sandwiched; and a front frame and a rear frame which face each other such that the plurality of battery cells are sandwiched, wherein the fixing portion overlaps with the rear frame when viewed from a left-right direction, and wherein the fixing portion overlaps with the side frames when viewed from a front-rear direction.

2. The battery pack according to claim 1, wherein the portion is a compliance bushing.

3. The battery pack according to claim 1, wherein the suspension is a rear suspension.

4. The battery pack according to claim 3, wherein the fixing portion is disposed at a corner portion formed by the side frame and the rear frame.

5. The battery pack according to claim 1, wherein the battery cell is a solid-state battery.

\* \* \* \* \*